US011798273B2

(12) United States Patent
Roberts et al.

(10) Patent No.: US 11,798,273 B2
(45) Date of Patent: Oct. 24, 2023

(54) MODEL-BASED IMAGE CHANGE QUANTIFICATION

(71) Applicant: Lawrence Livermore National Security, LLC, Livermore, CA (US)

(72) Inventors: Randy S. Roberts, Livermore, CA (US); John Goforth, Carlsbad, CA (US)

(73) Assignee: LAWRENCE LIVERMORE NATIONAL SECURITY, LLC, Livermore, CA (US)

( * ) Notice: Subject to any disclaimer, the term of this patent is extended or adjusted under 35 U.S.C. 154(b) by 148 days.

(21) Appl. No.: 17/199,678

(22) Filed: Mar. 12, 2021

(65) Prior Publication Data

US 2022/0292278 A1 Sep. 15, 2022

(51) Int. Cl.
*G06V 20/13* (2022.01)
*G06T 7/174* (2017.01)
(Continued)

(52) U.S. Cl.
CPC ............ *G06V 20/13* (2022.01); *G06F 18/214* (2023.01); *G06F 18/217* (2023.01); *G06T 7/174* (2017.01);
(Continued)

(58) Field of Classification Search
CPC ........ G06V 20/13; G06V 10/44; G06V 10/60; G06V 10/774; G06V 10/776;
(Continued)

(56) References Cited

U.S. PATENT DOCUMENTS 6,449,392 B1 * 9/2002 Divakaran ............. H04N 19/48
382/235
6,914,599 B1 * 7/2005 Rowe ........................ G06T 7/97
382/154
(Continued)

FOREIGN PATENT DOCUMENTS

WO 2006027339 A2 3/2006
WO 2017040691 A1 3/2017

OTHER PUBLICATIONS

"The Compendium of Controlled Extensions (CE) for the National Imagery Transmission Format (NITF)," v. 2.1, National Imagery and Mapping Agency, Nov. 16, 2001.
(Continued)

*Primary Examiner* — Aaron W Carter
(74) *Attorney, Agent, or Firm* — Perkins Coie LLP

(57) ABSTRACT

A system is provided for identifying and quantizing a change in a scene having objects based on comparison of features representing a target object derived from a first image and a second image that includes the target object. The system segments, based on a scene model of the scene, a second image that includes the target object to identify a second area representing the target object within the second image. The system extracts, from the second image, second features for the target object based on the second area. The system determines a second effectiveness of the second features indicating effectiveness of the second features in representing the target object. The system detects a change based on a difference between first features and the second features factoring in a first effectiveness and the second effectiveness.

31 Claims, 9 Drawing Sheets

(51) Int. Cl.

| | |
|---|---|
| *G06V 10/44* | (2022.01) |
| *G06V 10/60* | (2022.01) |
| *G06V 10/774* | (2022.01) |
| *G06V 10/776* | (2022.01) |
| *G06F 18/214* | (2023.01) |
| *G06F 18/21* | (2023.01) |
| *G06V 10/46* | (2022.01) |

(52) U.S. Cl.
CPC ............. *G06V 10/44* (2022.01); *G06V 10/60* (2022.01); *G06V 10/774* (2022.01); *G06V 10/776* (2022.01); *G06V 10/462* (2022.01); *G06V 2201/07* (2022.01)

(58) Field of Classification Search
CPC ............. G06V 10/462; G06V 2201/07; G06V 20/176; G06F 18/214; G06F 18/217; G06T 7/174; G06T 2207/10024; G06T 2207/10032; G06T 2207/10036; G06T 2207/20076; G06T 2207/20081; G06T 2207/30184; G06T 7/12; G06T 7/40; G06T 7/75; G06T 7/11
See application file for complete search history.

(56) References Cited

U.S. PATENT DOCUMENTS

| | | | |
|---|---|---|---|
| 7,528,938 | B2 | 5/2009 | Garceau et al. |
| 8,144,937 | B2 | 3/2012 | Zimmer et al. |
| 8,837,774 | B2 | 9/2014 | Walter et al. |
| 10,019,824 | B2 | 7/2018 | Roberts et al. |
| 10,303,966 | B2 | 5/2019 | Coulter et al. |
| 10,306,203 | B1* | 5/2019 | Goyal .................. H04N 13/128 |
| 10,546,051 | B2 | 1/2020 | Roberts et al. |
| 10,769,442 | B1* | 9/2020 | Ding ..................... G06T 7/254 |
| 11,089,305 | B2* | 8/2021 | Guo ..................... H04N 19/172 |
| 2005/0002544 | A1* | 1/2005 | Winter ..................... G08G 1/14 382/104 |
| 2005/0025361 | A1* | 2/2005 | Gadre ................... H04N 5/147 382/181 |
| 2005/0135687 | A1* | 6/2005 | Boice ................... H04N 19/176 375/E7.176 |
| 2006/0233423 | A1* | 10/2006 | Najafi ..................... G06T 7/77 382/103 |
| 2009/0251613 | A1* | 10/2009 | Kervec .................. G06T 7/254 348/700 |
| 2011/0188836 | A1* | 8/2011 | Popkiewicz ......... G11B 27/036 386/300 |
| 2013/0182079 | A1* | 7/2013 | Holz ....................... G06T 7/593 348/47 |
| 2014/0064554 | A1* | 3/2014 | Coulter .................. G06V 20/13 382/294 |
| 2015/0109513 | A1* | 4/2015 | Nayar .................. G02B 27/646 348/349 |
| 2017/0076438 | A1* | 3/2017 | Kottenstette ......... G06V 10/764 |
| 2017/0284800 | A1* | 10/2017 | Schoner ................. G06F 16/50 |
| 2019/0258899 | A1* | 8/2019 | Coogan ................ G06F 18/214 |
| 2020/0401617 | A1* | 12/2020 | Spiegel ............... G06F 16/5866 |
| 2020/0410770 | A1* | 12/2020 | Choi ....................... H04N 21/81 |
| 2021/0142497 | A1* | 5/2021 | Pugh .......................... G06T 7/55 |
| 2022/0292278 | A1* | 9/2022 | Roberts ................. G06V 10/44 |
| 2022/0319172 | A1* | 10/2022 | Ramanathan .......... G06V 20/52 |

OTHER PUBLICATIONS

<https://en.wikipedia.org/wiki/Autoencoder> retrieved on Feb. 24, 2022.

<https://en.wikipedia.org/wiki/Cluster_analysis> retrieved on Feb. 24, 2022.

Earth-i <earthi.space/> retrieved on Jan. 26, 2022.

Gonzalez and Woods, "Digital Image Processing," Third edition, Pearson Education, 2008.

Lutz, Kolemann. "How satellite imagery is revolutionizing the way we invest," Dec. 31, 2018, 16 pages <medium.com/@kolemannlutz/how-satellite-imagery-is-revolutionizing-the-wa-da44bfb95d89>.

Onishi, R.M. et al. "Radius: research and development for image understanding systems phase 1," in the 20th AIPR Workshop: Computer Vision Applications: Meeting the Challenges, vol. 1623. International Society for Optics and Photonics, 1992, pp. 152-161.

Roberts, R. "Model-Based Anomaly Discovery in Satellite Imagery," white paper submitted to Kevin Jackman at the National Geospatial Intelligence Agency, Aug. 10, 2019.

Roberts, R. et al. "A Visual Wikipedia for Satellite Imagery," Optics and Photonics for Information Processing XII, APIE International Symposium on Optical Engineering, Aug. 19-23, 2018, San Diego CA, LLNL-CONF-747477.

Roberts, R. et al. "Automated Annotation of Satellite Imagery using Model-based Projections—Presentation," 2018 IEEE Applied Imagery and Pattern Recognition Workshop, Oct. 9-11, 2018, Washington DC, LLNL-PRES-75790.

* cited by examiner

MODEL-BASED IMAGE CHANGE QUANTIFICATION

STATEMENT REGARDING FEDERALLY SPONSORED RESEARCH

This invention was made with Government support under Contract No. DE-AC52-07NA27344 awarded by the United States Department of Energy. The Government has certain rights in the invention.

BACKGROUND

Many organizations (e.g., county governments or companies) have a need to detect changes in natural and man-made objects (e.g., ice dams and buildings). For example, a county government may want to detect when a building is being modified to ensure that the appropriate approvals have been obtained. An oil company may want to detect changes over time in the construction of an oil rig to monitor its progress. An emergency management organization (e.g., U.S. FEMA) may want to detect changes to critical infrastructure (e.g., dam and bridges) resulting from a natural disaster.

Satellite imagery has been used to detect such changes. For example, governments of some countries have used satellite imagery to monitor development of industrial and military sites in other countries. As changes in a sequence of satellite imagery are compiled, an organization can detect and model patterns of human activity and natural processes (e.g., lava flows). Accurate detection of such changes in satellite imagery can be very important for national security, emergency response, resource management, urban planning, and economic forecasting.

Geospatial imagery may include a satellite image and metadata that represents the ground-to-image geometry. The ground-to-image geometry allows a geospatial coordinate (e.g., latitude, longitude, and height) to be mapped to the corresponding pixel coordinate (e.g., row number and column number) of the satellite image. A Rational Polynomial Coefficient (RPC) camera model is one type of such metadata. The RPC camera model is an approximation of a Rigorous Projection Model that describes the precise relationship between image coordinates and ground coordinates. (See, "The Compendium of Controlled Extensions (CE) for the National Imagery Transmission Format (NITF)," v. 2.1, National Imagery and Mapping Agency, Nov. 16, 2001.) The RPC camera model provides 20 numerator coefficients and 20 denominator coefficients for a row equation and 20 numerator coefficients and 20 denominator coefficients for a column equation. The row equation inputs a geospatial coordinate and outputs the row number that contains the pixel of the image corresponding to that geospatial coordinate, and the column equation inputs a geospatial coordinate and outputs the column number that contains the pixel of the image corresponding to that geospatial coordinate. All the geospatial coordinates along a ray from the camera to a point on the surface of the earth map to the same pixel coordinate.

DETAILED DESCRIPTION

Figure 1A:
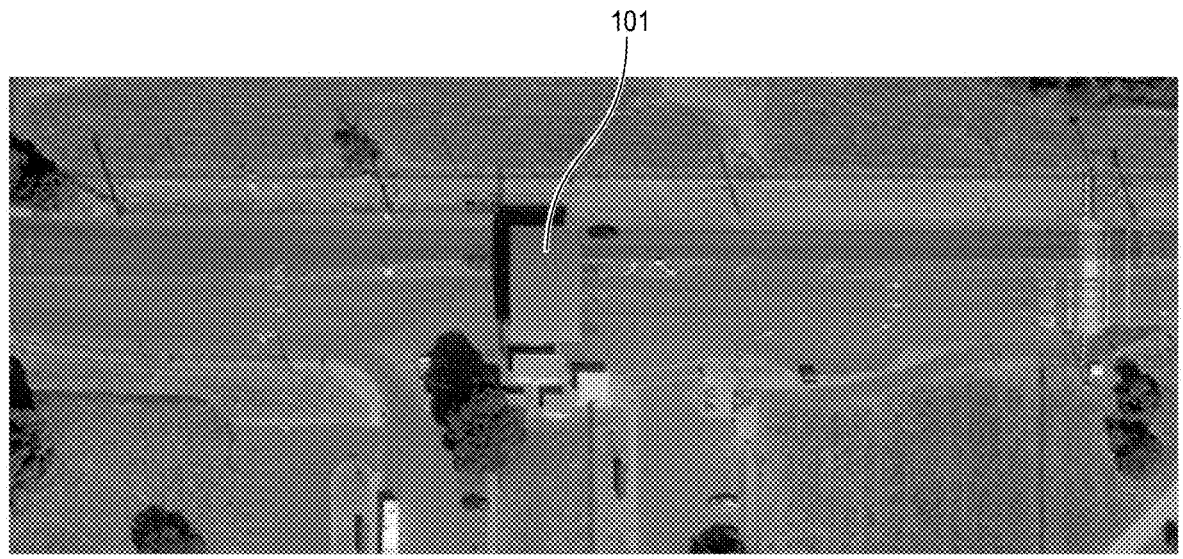
FIG. 1A illustrates an example target image.

Methods and systems are provided for detecting and quantifying changes in a sequence of geospatial imagery. The detected changes can be used to identify patterns of activity and correlations between events. In some embodiments, a model-based change quantification (MCQ) system detects and quantifies changes in objects (e.g., buildings) by segmenting a captured image, referred to as a target image, of a scene that contains objects to identify portions of the target image that contain an object. For example, a scene may represent the buildings of an industrial complex or a dam and reservoir. To segment a target image, the MCQ system generates a projection of a scene model that provides 3D representation of the scene on to the target image. The scene model may represent characteristics or features of the objects such as edges (e.g., defined by x-, y-, and z-coordinates of its endpoints), color, and texture. For example, a building may be modeled as a set of surfaces (e.g., roof and walls) that is each represented by its edges, color, and texture (e.g., shingle roof or sheet metal roof). After the target image is segmented, the MCQ system extracts from the target image features of the object whose changes are to be detected and quantified (referred to as a target object). The MCQ system then quantifies the amount of change based on differences between features representing the target object that are extracted from the target image and features representing the target object that are extracted from an earlier captured image (or a projection of the scene model). The determination factors in shadows cast by objects (e.g., smoke stacks and vegetation) of the scene on the target object and obstructions of the target object resulting from objects of the scene that are in front of the target object based on the line of sight of the device that captures the target image. The shadows and obstructions "obscure" the target object resulting in uncertainty in the effectiveness of features extracted from the target image in accurately representing the target object. If the amount of changes satisfies a change detection criterion, the MCQ system indicates that the target object has changed and quantifies the amount of change.

In some embodiments, the MCQ system identifies a change in a target object based on comparison of images that include the target object that are captured at different times and are collected with different capture conditions such as different camera models and illumination conditions (e.g., solar ephemeris). Since the images are collected under different capture conditions (e.g., capture angles), the features of the target object that are extracted from the images are likely to be different. For example, an edge representing a corner of a building may be obscured in one of the images but not the other. The MCQ system may not be able to extract any features relating to the edge representing the corner. Thus, the MCQ system may detect and quantify changes based on features that can be extracted from both images.

The scene model may be generated manually and automatically or a combination of manually and automatically. For example, a model generator may input electronic blueprints of an industrial complex and generate a representation of each structure that specifies its surfaces using the edges of each surface. In such a case, additional features of the structures (e.g., color of surfaces) may be input manually, for example, using a computer-aided design (CAD) tool. As another example, a model generator may automatically generate a scene model using a sequence of imagery and techniques from photogrammetry.

For each image that is captured, the MCQ system segments the image based on the scene model to identify objects (e.g., image chips) within the image. To segment a target image, the MCQ system generates from the scene model an object bitmap (e.g., a binary mask) that represents the portion of each object that is not obscured in the target image given the capture conditions of the image. The MCQ system then overlays the target image with the object bitmap to identify the objects within the target image. The MCQ system may generate the object bitmap and identify objects using the PRISM algorithm. The PRISM algorithm projects a scene model onto an image and is described in U.S. Pat. No. 10,019,824, entitled "Annotation of Images Based on 3D Model of Objects" and issued on Jul. 10, 2018, which is hereby incorporated by reference. The MCQ system, however, projects the scene model on to the target images, rather than vice versa.

After segmenting the target image, the MCQ system extracts features of the target object factoring in obscurations, both shadows and obstructions, and estimates uncertainty in the features caused by the obscurations. Shadows and obstructions may be present when the illumination source and capture angle are off nadir.

When a shadow is cast by another object (or even by a portion of the target object) onto the target object, the features in the area covered by the shadow may be difficult to extract. The difficulty arises because the differences in color (e.g., gray scale) may be subtle between the portion of the target object and surrounding area that are in the shadow. When the differences are subtle, the edges of the target object that are within the shadow may be difficult to detect. In addition, the color and texture of a portion of the target object that is within the shadow may be difficult to determine because of diminished illumination caused by the shadow. When the target object is obstructed by another object, the MCQ system may not able to extract features of the obstructed area. As a result, the extracted features may accurately represent only the non-obstructed portion of the target object. As described below, the MCQ system may extract some features from a shadow cast on the target image. For example, the MCQ system may determine the length and location of an edge of the target object based on analysis of its shadow factoring in the capture conditions (e.g., angle of illumination).

If the portion of the target object that is obscured is a significant portion of the target image, the uncertainty that the features accurately represent the target object may be high. For example, if half of the target object is obscured, a change in the obscured portion may not be reflected in the extracted features and thus the uncertainly may be high. When the extracted features of the target image are compared to the corresponding features of a prior image, any differences in the obscured portion may be difficult to detect. Such uncertainty relating to obscuration of the target images is referred to as "epistemic" uncertainty. The MCQ system quantifies and factors in the epistemic uncertainty of extracted features when detecting a change.

Although shadows may increase the uncertainly of features extracted from the portion of the target object that is within a shadow, the MCQ system may use a shadow cast by the target object to extract some features of the target object. For example, if target object is small smokestack that is entirely obscured by a large smokestack and the illumination source is 90 degrees from the viewing angle, the shadow cast by the small smokestack may be visible. In such a case, the MCQ system may extract features of the shadow (e.g., length of an edge of the shadow) and estimate features of the smokestack itself (e.g., length of an edge of the smokestack). For example, if an earthquake caused the top portion of the smokestack to break off, the shadow of the broken smokestack may be shorter than would be expected if the smokestack was not broken. As a result, the MCQ system generates an estimate of the height of the broken smokestack (e.g., length of an edge) that is shorter than an estimate based on an image captured prior to the earthquake.

The MCQ system generates a change score indicating or quantifying the amount of change in the target object based on differences in features of the target object extracted from the target image and a prior image. The MCQ system also determines the effectiveness of the features in representing based on epistemic uncertainly and aleatory uncertainty. Epistemic uncertainty represents uncertainty in the features resulting obscuration of the target object. Aleatory uncertainty represents uncertainty in the features represents random errors such as accuracy or precision of the scene model and noise in an image. The change score represents the difference in the features (e.g., difference feature vectors) factoring in the uncertainties. The epistemic and aleatory uncertainties are represented as a value assigned to each feature. For example, an edge of a surface a target object may be given a large uncertainty if a large portion the edge is obscured and thus its features cannot be extracted from a target image. The larger the uncertainty of a feature, the less likely the feature will useful in detecting a change. If the change score factoring in the uncertainties satisfies a change criterion (e.g., above a threshold value), the MCQ system indicates that a change has been detected.

In some embodiments, the MCQ system may generate a feature change score for each feature of the target object. For example, the MCQ system may generate a feature change score for each edge and a feature change score for the color and for the texture of each area (e.g., roof or side) of the target object. By generating feature change scores, the MCQ system is able to identify features that have changed and to quantify the changes. By quantifying changes in features, the MCQ system is able to indicate, for example, that a change to a building results from a change in an edge length indicating a change in the height of a chimney after an earthquake or from a change in texture of a wall of the building after a vehicle crashed into the wall.

Although the MCQ system is described primarily in the context of comparing a target image to a prior image, the MCQ system may compare a target image to a modeled image. The MCQ system generates a modeled image that represents an image of the model based on the capture condition of the captured image. The MCQ system then extracts features of the target object within modeled image and determines whether a change has occurred based on the difference between those features and features extracted from the target image. Although the MCQ system is describe primarily in the context of change detection and quantification, the MCQ system may adapted to be used as a model-based change detection system (MCD) system to detect a change without providing a quantification of the change.

In some embodiments, the MCQ system may determine whether a change has occurred based on a collection of prior images rather than a single prior image. For each feature, the MCQ system may generate a feature change function that, given a value for that feature (e.g., extracted from the target image), generates a feature change score indicating whether the value is considered to be an "outlier" that is not within a range of values the are considered to represent no change. The MCQ system may generate the feature change function for a feature by linearly fitting the values of that feature extracted from the prior images. The MCQ system then identifies a feature change threshold for a feature that tends to maximize the number of prior images whose feature change scores are below the feature change threshold ("inlier images") and minimize the number of prior images whose feature change scores are above the feature change threshold ("outlier images").

After the feature change thresholds are determined, the MCQ system determines whether each feature of the target object of the target image represents a change. For each feature, the MCQ system inputs the value of that feature to the feature change function for that feature to generate a feature change score. If the feature change score for a feature is above the feature change threshold for that feature, the MCQ system uses that feature to detect whether a change has occurred. The MCQ system then generates a change score based on the values of those features above their feature change thresholds (i.e., outliers) factoring the uncertainties. If the change score is above a threshold value, the MCQ system indicates that a change has occurred.

In some embodiments, the MCQ system may be employed to quantify the overall change in scene (or collection of objects) rather than on an individual object basis. As an example, such quantification may be useful to assess the overall change in a scene when the change to any individual object may be relatively small. In the case of an industrial complex with multiple buildings, parking lots, and fences, a hurricane may slightly damage the roofs of some building, flood a portion of a parking lot, and topple a portion of a fence. The overall change in the industrial complex may provide a more accurate assessment of the extent of damage than the damage to each object individually. The quantification of overall change in a scene may also be used to detect gradual changes in a scene and correlations between changes of individual objects based on processing images of the scene collected over time. In such a case, the MCQ system may process each image to extract features and determine uncertainties associated with the objects. The MCQ system may generate a change score based on the combined features and uncertainties of one image and a prior image or an aggregation of features of prior images.

In some embodiments, the MCQ system may be employed to identify correlations between changes to a scene. For example, a few hours before planes are to takeoff from a military installation, a fuel tanker may be sent to refuel the planes, or a maintenance vehicle may be sent to inspect the planes. The correlation between the presence of a vehicle in an image and the lack of presence of the planes in a subsequent image (or detection of the takeoff by radar) can be used to identify a pattern. Knowledge of that pattern may be used to predict when a takeoff is imminent.

The MCQ system may also provide a user interface that allows a user to view patterns of changes. The user interface may provide a list of objects of a scene or an image of the scene. The user may select an object from the list or the image. When a user selects an object, the MCQ system may display a time series of images of that object or features derived from that object. The user interface may help a user inspect and correlate changes in a scene.

In some embodiments, the MCQ system may employ multiple scene models to track changes in a scene over time. For example, to track development of a petroleum production site, scene models for different phases of production such as a cleared site, a site with a pad, a site with a drilling rig, and a site with a production well may be used. The MCQ system may be used to quantify the difference between an image and each of the scene models. If the difference is small between the image and a scene model, the development may be considered to be in that phase.

The table below provides a description of terminology used to describe the MCQ system.

| Term | Definition |
| --- | --- |
| object bitmap | bitmap derived from the scene model with 1 s corresponding to target object |
| obstructed bitmap | bitmap derived from the scene model with 1 s corresponding to the obstructed portion of the target image |
| unobstructed bitmap | bitmap derived from the scene model with 1 s corresponding to the unobstructed portion of the target image |
| shadow bitmap | bitmap derived from the scene model with 1 s corresponding to the portion of the target image within a shadow |
| non-shadow bitmap | bitmap derived from the scene model with 1 s corresponding to the portion of the target image not within a shadow |
| edge bitmap | bitmap derived from the target image with 1 s corresponding to the portions of the target image that are edges (e.g., derived using the Canny algorithm) |
| edge frame bitmap | bitmap derived from object bitmap with 1 s corresponding to edges of the target object that have been thickened |
| object edge bitmap | bitmap derived from edge frame bitmap and the edge bitmap with 1s corresponding to edges of the target object in the target image |

Scene Models

The MCQ system represents a "real-world" scene with a 3D scene model $\mathcal{M}$, which comprises a set of object models $\mathcal{M} = \{\mathcal{M}_1, \mathcal{M}_2, \ldots, \mathcal{M}_K\}$ that represent objects within the scene. The object models are a set of surfaces $\{S_1, S_2, \ldots, S_L\}$. The surfaces are a set of edges $\{e_1, e_2, \ldots, e_{n_e}\}$ that link vertices, colors $\{c_1, c_2, \ldots, c_{n_c}\}$, and textures $\{t_1, t_2, \ldots, t_{n_t}\}$. For example, a scene model may include object models for roadways, buildings, and parking areas. The surfaces of the roadways and parking areas may have a common color but no texture, while the surfaces of the buildings may have different colors and different textures. A scene model may include object models of objects that are considered important in detection of change of interest (e.g., broken smokestack).

The MCQ system augments object models with data structures representing features useful in detecting and quantifying a change of interest along with the uncertainties of those features. The data structures may include: a feature vector X(k), a weight vector w, an epistemic uncertainty vector $Q_d(k)$, and an aleatory uncertainty vector $Q_r(k)$. The index k indicates the that the MCQ system derived that feature vector from the $k^{th}$ image of a sequence of imagery l(k), k=1,2,3, . . . K collected over the scene. The elements of the feature vectors may represent edges $e_i$, colors $c_i$, and textures $t_i$ of the surfaces of object models. Epistemic uncertainty represents uncertainty in the edge, color, and texture features resulting from shadows and obscuration. The elements of the epistemic uncertainty vector may include uncertainties for edge, color, and texture features denoted by $\Delta e_i$, $\Delta s_i$ and $\Delta t_i$. The elements of the aleatory uncertainty represent uncertainty in the edge, color, and texture features resulting from to random errors such as model accuracy or precision and image noise. The MCQ system may represent an aleatory uncertainty for a feature as a probability distribution that is specific to the sensor used to collect an image and its measurements. The elements of the aleatory uncertainty vector may include uncertainties for edge, color, and texture features denoted by $\delta e_i$, $\delta s_i$ and $\delta t_i$ where $\delta$ is a measure of the width of an area of the probability density representing the random errors of the sensor and its measurements of the features. The feature vector, epistemic uncertainty vector, and aleatory vector may be represented by the following vectors:

$$X(k) = \begin{bmatrix} e_1(k) \\ \vdots \\ e_{n_e}(k) \\ c_1(k) \\ \vdots \\ c_{n_s}(k) \\ t_1(k) \\ \vdots \\ t_{n_t}(k) \end{bmatrix}, Q_d(k) = \begin{bmatrix} \Delta e_1(k) \\ \vdots \\ \Delta e_{n_e}(k) \\ \Delta c_1(k) \\ \vdots \\ \Delta c_{n_s}(k) \\ \Delta t_1(k) \\ \vdots \\ \Delta t_{n_t}(k) \end{bmatrix}, Q_r(k) = \begin{bmatrix} \delta e_1(k) \\ \vdots \\ \delta e_{n_e}(k) \\ \delta c_1(k) \\ \vdots \\ \delta c_{n_s}(k) \\ \delta t_1(k) \\ \vdots \\ \delta t_{n_t}(k) \end{bmatrix}$$

where $n_e$, $n_s$ and $n_t$ are the number of edge features, color features, and texture features respectively. Weight vector $w^T=(w_1, w_2, \ldots, w_n)$ quantifies the relative importance of elements in the feature vector (e.g., $0.0 \leq w_i \leq 1.0$) and may remain constant over time (is the same for the K images). For example, if the overall objective of change quantification is to determine whether an oil rig is in operation, the MCQ system may receive images of the oil rig collect over time (e.g., 1 second intervals) and detect whether the position of the pump jack has changed. If so, the oil rig may be considered to be in operation. In such a case, the weight for the texture of a surface of the pump jack may be given a value of 0.0 indicating the texture is considered unimportant in detecting a change in position of the pump jack. As another example, in certain types of change quantification, changes of some edges may not be important to the type of change to be detected. For example, the bottom edge of a wall of a building may not be important in determining whether the roof has been damaged. The MCQ system may assign a relatively low weight edge features representing such "unimportant" edges of the target object. In some embodiments, the MCQ system may weigh the features uniformly by setting all the elements of the weight vector to unity ($w_i=1$).

Extracting Object Features from an Image

The MCQ system identifies the portion of a target object in a target image that is obscured by an object, that is, in the shadow of or obstructed by an object. The MCQ system may use the PRISM algorithm to generate an object bitmap for each of the model objects in a scene model corresponding to the scene of the target image. An object bitmap for an object has bit values of 1 indicating the corresponding pixels of the target image that contain that object. For example, an object bitmap for a building may have bits corresponding to the surfaces of the building set to a bit value of 1 and all the bits such as those corresponding to pavement, vegetation, and other objects set to a bit value of 0. The bit coordinates of an object bitmap may have one-to-one correspondences with the pixel coordinates of the target image. For example, if the target image is 1920×1080 pixels, the object bitmap is 1920×1080 bits. The MCQ system uses the object bitmaps to segment a target object from the rest of the target image to extract edge, color, texture, and shadow features representing the target object.

The MCQ system may create multiple bitmaps for each object of a target image: an object bitmap, a shadow bitmap, a composite object bitmap, and a composite shadow bitmap. An object bitmap for an object represents a view of the object given the capture conditions when unobscured that is not being obstructed and not being in a shadow. A shadow bitmap for an object represents the area of the target image that is within a shadow cast by that object given the capture conditions.

In some embodiments, the MCQ system may create a composite object bitmap that has a bit value of 1 for every bit corresponding to a pixel of the image that is part of an object (other than the target object). The MCQ system may generate the composite object bitmap for a target object by logically ORing the object bitmaps of objects other than the target object. The MCQ system may create a composite shadow bitmap that has a bit value of 1 for every bit corresponding to a pixel of the images that is within a shadow. The MCQ system may generate the composite shadow bitmap by logically ORing the shadow bitmaps (other than the shadow bitmap for the target object—assuming the target object does not cast a shadow on itself).

After generating the composite bitmaps, the MCQ system determines how much of the target object is obstructed based on the object bitmap and the composite object bitmap. The MCQ system may determine the portion of the target object that is obstructed by other objects by logically ANDing the object bitmap for the target object and the composite object bitmap. Similarly, the MCQ system may determine the portion of the target object that is within a shadow by logically ANDing the object bitmap for the target object and the composite shadow bitmap.

As an example, a target image of a scene may contain three objects, building 1, building 2, and building 3, where building 2 (the target object) is sandwiched between and slightly obstructed by buildings 1 and 3. Using the PRISM algorithm, the MCQ system generates from the scene model an object bitmap for buildings 1, 2, and 3. The MCQ system generates a composite object bitmap for buildings 1 and 3 by logically ORing the object bitmaps for buildings 1 and 3. The MCQ system may generate an obstructed object bitmap for building 2 that represents the portions of building 2 that are obstructed by buildings 1 and 3 by logically ANDing the object bitmap for building 2 with the composite object bitmap for building 1 and 3. The MCQ system may generate an unobstructed bitmap for building 2 that represents the unobstructed portion of building 2 by logically XORing the object bitmap of the target object and the obstructed bitmap. The MCQ system may generate a shadow bitmap and a non-shadow bitmap is a similar way.

After generating the bitmaps, the MCQ system estimates the epistemic uncertainty of features of the target object that are extracted from the target image. As described above, the epistemic uncertainty for the target object increases as the object becomes more obscured. The epistemic uncertainty increases because features cannot be extracted from obstructed portions and are difficult to extract from portions in a shadow (e.g., because of poor contrast). The MCQ system may estimate the epistemic uncertainty based on the area and/or the perimeter of the target object that is not obscured. The epistemic uncertainties of features of an edge increase as the obscured area and/or the obscured portion of the perimeter increases. When the ratio of the obstructed area or obstructed perimeter to the unobstructed area or unobstructed perimeter is sufficiently large, the MCQ system may disregard features derived from the obstructed portions. The MCQ system thus uses epistemic uncertainty to determine which features should be extracted from the target object and used to detect a change.

Figure 1B:
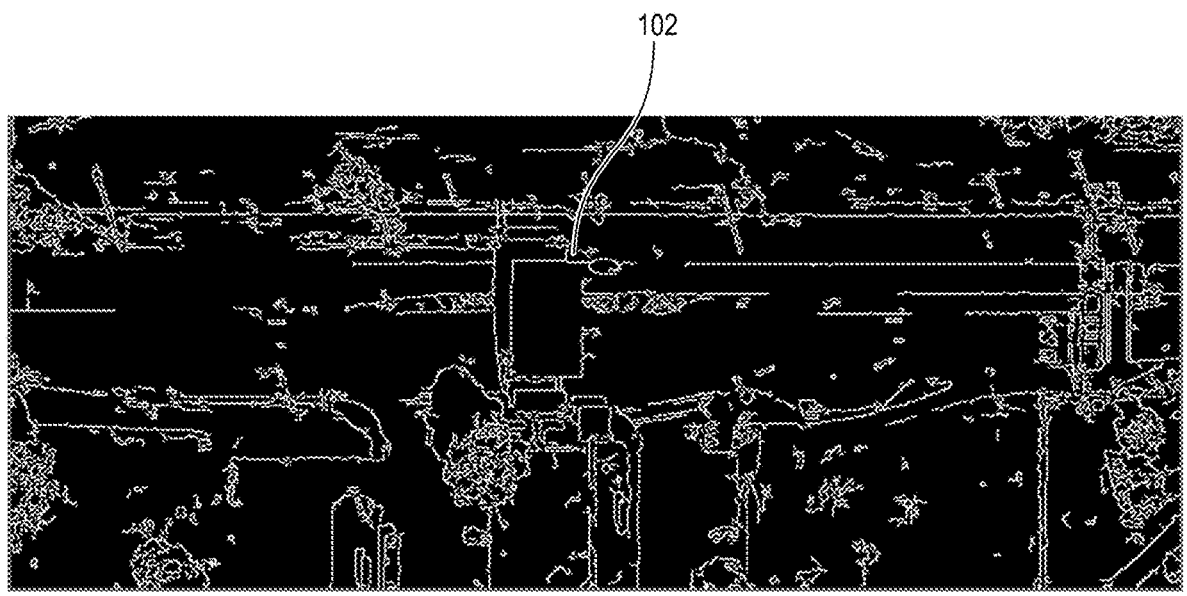
FIG. 1B illustrates an edge bitmap derived from the target image of FIG. 1A.

The MCQ system detects edges of a target object and extracts edge features from the edges. Edges are used, for example, to detect changes in the shape of the target object. The MCQ system applies the edge detector (e.g., Canny edge detector) to the target image to produce an edge bitmap with 1s indicating a portion of an edge. FIG. 1A illustrates an example target image. The structure 101 represents a checkpoint for clearing vehicles as they enter a facility. FIG. 1B illustrates an edge bitmap derived from the target image of FIG. 1A. The area 102 represents the edges of the structure 101 that are derived from the target image. The edges of area 102 are somewhat jagged and not contiguous resulting from, for example, noise or shadows in the target image.

Figure 2A:
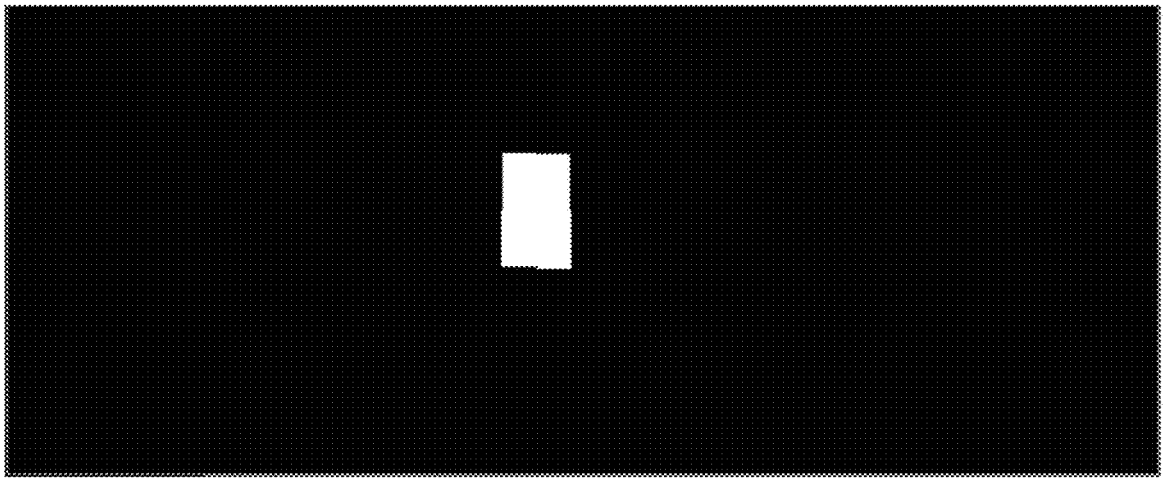
FIG. 2A illustrates an object bitmap for a structure of FIG. 1A.
Figure 2B:
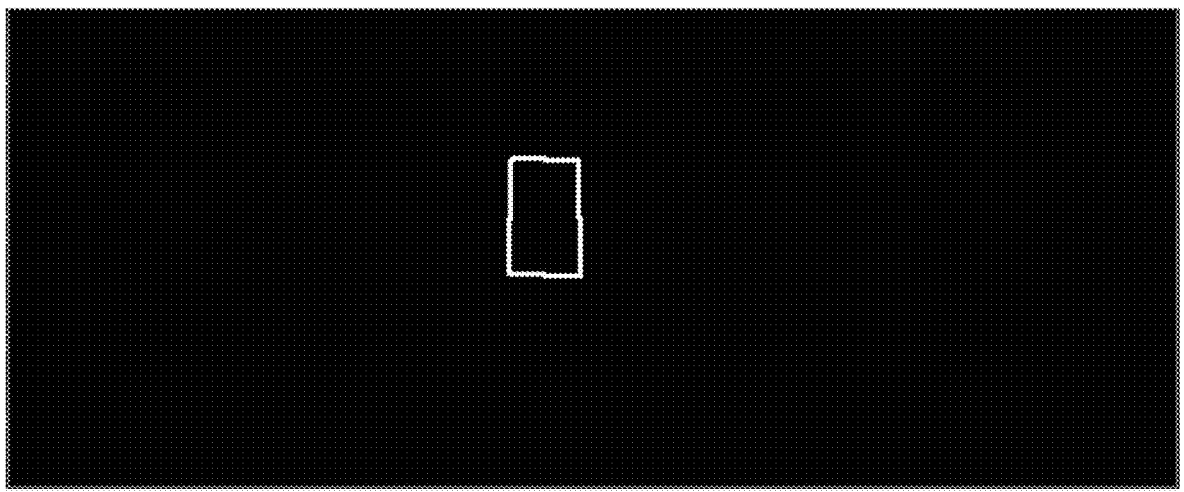
FIG. 2B illustrates an example edge frame bitmap based on the object bitmap of FIG. 2A.
Figure 3A:
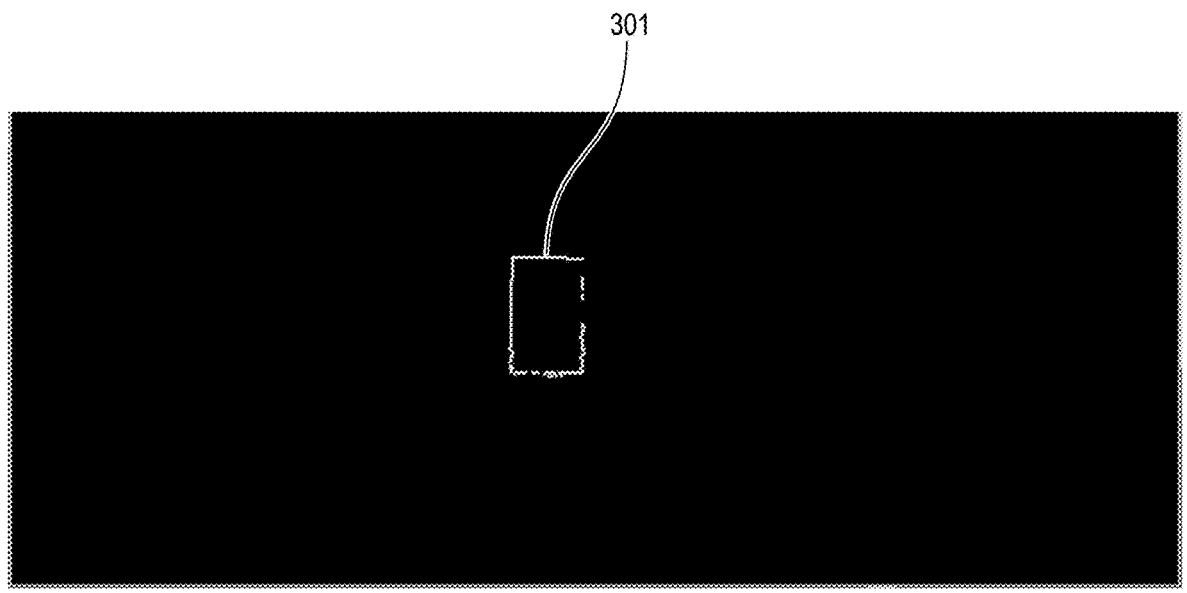
FIG. 3A illustrates an object edge bitmap produced.

To identify pixels that are part of the edges of the target object, the MCQ system may generate an object edge bitmap by logically ANDing the object bitmap for the target object and the edge bitmap resulting in a bitmap with a value of 1 for each pixel of the edge bitmap that is part of the target object. However, the object edge bitmap will, like the edge bitmap, have edges with pixels that are jagged and not contiguous. To help identify pixels that are part of the same edge, the MCQ system may, before logically ANDing the object bitmap and the edge bitmap, generate an edge frame bitmap by dilating the edges of the object bitmap. To dilate the edges, the MCQ system may apply a small symmetric kernel to the edges of the object bitmap for the target image resulting in the edge frame bitmap. FIG. 2A illustrates an object bitmap for structure 101. FIG. 2B illustrates an example edge frame bitmap based on the object bitmap of FIG. 2A. The edge frame bitmap has thicker edges to compensate for edges that are not contiguous in the edge bitmap. For example, the dilation kernel may be a three-by-three matrix that is convolved with the object bitmap to thicken the edges, for example, from a width of one pixel to three pixels and to connect edge pixels that are not contiguous. The MCQ system generates the object edge bitmap by logically ANDing the edge bitmap with the edge frame bitmap so that pixels corresponding to edges of the target object have a bit value of 1 and other pixels have a bit value of 0. FIG. 3A illustrates an object edge bitmap produced.

The MCQ system generates the object edge bitmap 301 by logically ANDing the edge bitmap of FIG. 1B with the edge frame bitmap of FIG. 2B.

The MCQ system extracts edge features from the edge frame bitmap. An edge feature of an edge may be the number of pixels in the edge. Some target objects, however, may also have many small edges, and it may be difficult to extract effective edge features from such small edges. To overcome this difficulty, the MCQ system may consider the perimeter of the target object as a single edge and partition the target object of the edge frame bitmap. For example, the edges of a rectangular object may be partitioned into four quadrants. The MCQ system may extract an edge feature $e_i(k)$ that represents the ratio of number of edge pixels in the $i^{th}$ quadrant to the number of edge pixels in the object bitmap as represented by the following equation:

$$e_i(k) = \frac{\text{Number of bits in } i^{th} \text{ quadrant of the edge frame bitmap}}{\text{Number of edge bits in object edge bitmap}}$$

Figure 3B:
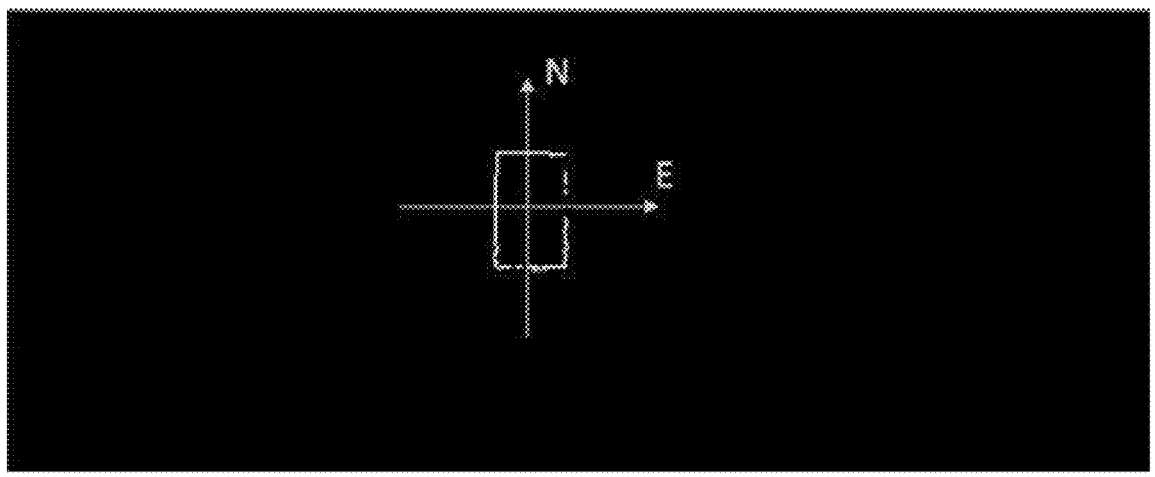
FIG. 3B illustrates a partitioning of target object of the object edge bitmap of FIG. 3A being partitioned into four quadrants.

The MCQ system may determine the number of edge pixels predicted by the object edge bitmap by applying the same partition to the target object of the object edge bitmap and dividing by the order of the dilation kernel. For example, if the target object is portioned into four quadrants, the MCQ system generates an edge feature for each quadrant by dividing the number of pixels in the quadrant of the edge frame bitmap by the dilation kernel and then dividing the result by the number of pixels of that quadrant in the object edge bitmap. For example, if the number of edge pixels in the first quadrant of the object edge bitmap is 50, the number of edge pixels in the first quadrant of the edge frame bitmap is 300, and a dilation kernel of 3×3 is applied, the MCQ system divides 300 by 3 and divides the result by 50 to give an edge feature of 0.5. FIG. 3B illustrates a partitioning of target object of the object edge bitmap of FIG. 3A being partitioned into four quadrants.

After generating edge features from the object edge image, the MCQ system may calculate epistemic uncertainties associated with the edge features as the ratio of the number of obscured perimeter pixels to the number of perimeter pixels in an edge or a quadrant. For example, if the number of obscured perimeter pixels in the first quadrant of the target object is 100 and the number of unobscured perimeter pixels in the first quadrant is 500, then the epistemic uncertainty is 0.2 (i.e., 100/500).

Color and Texture

In some embodiments, the MCQ system represents color and texture extracted from a target image with a single value per pixel (e.g., panchromatic or thermal infrared) or with a vector of values per pixel (e.g., multispectral or hyperspectral). For example, multispectral imagery is common in overhead imagery and is typically composed of three channels (e.g., red, green, blue) or four channels (red, green, blue, and near-infrared). The MCQ system may support other types of imagery such as shortwave infrared (SWIR), midwave infrared (MWIR) and long-wave infrared (LWIR), which can be represented by either a single value or a vector of values.

Depending on the imagery and application, the MCQ system extracts spectral features from target image of the object in different ways. The MCQ system may generate, for each spectral channel, a channel average of the values of the pixels corresponding to the target object. For example, if there are three spectral channels, R, G, and B, the MCQ system calculates a channel average for R, a channel average for B, and a channel average for B. The averages are spectral features. Alternatively, the MCQ system may normalize a channel average of a channel to be in the range of 0.0 and 1.0 by dividing the channel average by 2b where b is the number of bits of the spectral channel. In some embodiments, the MCQ system may also generate a spectral feature that represents the intensity of the surface of the target object by summing the normalized channel averages and dividing by the number of channels.

The MCQ system may also generate a texture feature that represents the texture of the target object. The texture represents the fine structure of a surface, which can vary from smooth to rough in an unstructured manner or periodic manner. The change in the texture of a target object may represent a change in the target object. For example, an asphalt parking lot might have a relatively smooth texture but may have rough texture during demolition (e.g., broken asphalt and presence of equipment) and a smooth texture when the asphalt is replaced with grass. The MCQ system may also be configured to process textures at varying resolutions. For example, if the goal is to assess potholes in a roadway, a high resolution may be used. In contrast, if the goal is to detect mudslides impacting the roadway, a lower resolution may be used.

In some embodiments, the MCQ system may use statistical, structural, and spectral methods to measure texture of a target object in a target image. A statistical method may factor in the variance of pixels within the target object as a measure of texture. For example, if the target image is represented as a gray scale with V possible values, the MCQ system may form a histogram of these values where $p(v_i)$ represents the count of pixels with the value $v_i$. The variance of these pixel values may be represented by the following equation:

$$\sigma_v^2 = \Sigma_{i=0}^{V-1}(v_i - \hat{m}_v)^2 p(v_i)$$

where $\hat{m}_v$ is the mean of the pixel values $v_i$. A normalized measure of texture (texture feature) may be represented by the following equation:

$$T = 1 - \frac{1}{1 + \sigma_v^2}$$

where T=0 implies a smooth surface and the roughness of the surface increases at T→1.

After extracting the spectral and texture features of the target object, the MCQ system calculates epistemic uncertainties for the features. The epistemic uncertainty may be represented by the ratio of the area of unobscured portion of the target object to the area of total area of the target object. For example, if the area of the unobscured portion is 50 pixels and the total area is 100 pixels, the epistemic uncertainty may be 0.5. The representing of an area as the count of pixels in a portion avoids having to calculate the area based on lengths of the edges of the portion. The MCQ system may also represent the aleatory uncertainty of a spectral feature as the standard deviation of the mean of the spectral values, and similarly for a texture feature.

Quantification of Change

The MCQ system quantifies the change in a target object based on the change in its shape (determined from edges), color (i.e., spectral content), and texture features. The amount of change may be relative to features predicted by the scene model or features extracted from other images of the target object. To quantify the changes between a target image and an object model, the MCQ system calculates the weighted difference between feature vectors (edge, color, and texture features) extracted from the target image and extracted from the corresponding model image. The MCQ system, however, disregard features who uncertainties satisfy a threshold uncertainty. Disregarding these features, the MCQ system calculates the difference between the feature vector derived from the target image and the feature vector derived from the model image (or prior image).

The MCQ system may also adjust the difference to mitigate possible variations in images such as variations in intensity based on variations in illumination conditions. The MCQ system may multiply the difference with a feature weighting vector that reflects the relative contributions of the features. For example, the MCQ system may assign a large feature weight to a shape feature and a small feature weight to a spectral or textural feature. As the magnitude of the weighted difference increases, the differences between features extracted from the target image and those extracted from the model image increase. The amount and type of difference (shape, color, texture) can be found by looking at the elements of the difference vector computed. When the magnitude of the weighted differences exceeds a change threshold, the MCQ system indicates that a change is detected.

As an example, the feature vectors derived from a target image and the model images may be [3, 4] and [1, 2], and the uncertainty vectors (the sum of the epistemic and aleatory vectors) may be [0.3, 0.4] and [0.1, 0.2]. If the uncertainty threshold is 0.35, then the MCQ system modifies the feature vector derived from the target image to be [3, Ø] with "Ø" indicating to disregard this feature. To determine the difference between the feature vectors, the MCQ system calculates the difference between [3, Ø] and [1, 2] to be [2, Ø]. If the feature weighting vector is [0.5, 0.3], the MCQ system represents the weighted difference as the inner product of [0.5, 0.3] with [2, Ø] which is 1.0. Thus, if the difference of 1.0 is greater than the change threshold, the MCQ system indicates that a change is detected.

In some cases, a prior image may have been captured during environmental conditions (e.g., partially cloudy) that may result in false positives. To address such false positives, the MCQ system may compare features derived from the target image to multiple prior images and determine whether a change has occurred based on an aggregation of the differences. As an alternative to individually comparing features derived from the target image to features derived from each prior image, the MCQ system may represent the features extracted from the prior images as a distribution of values of the features. Such a distribution represents an averaging out of measurement and modeling errors and may disregard of outlier measurements.

To detect outlier measurements, the MCQ system may employ the RANSAC (Random Sample Consensus) algorithm to compare feature vectors and detect which elements in which feature vectors are outliers. The MCQ system collects K images, which can a series of images over time, and extracts K feature vectors X(k−1), X(k−2), . . . X(1) and calculates the associated uncertainties. To remove values with unacceptable uncertainty, the MCQ system filters the feature values $x_i(k)$, k=1,2, . . . , K of the K feature vectors based on their epistemic uncertainty $\Delta x_i(\cdot)$ and aleatory uncertainty $\delta x_i(\cdot)$. If the sum of the epistemic and aleatory uncertainty for an element of a feature of an image exceeds an uncertainty threshold, the MCQ system does not consider that element of that feature in the outlier detection. For example, if the feature vector is [3, 4], the epistemic uncertainty vector is [0.3, 0.4] at time step K=2, and the aleatory uncertainty vector is [0.2, 0.6] for image K=2, the MCQ system determines the overall uncertainty for the value 3 of the first element to be 0.4 (0.3+0.2/2) and for the value 4 of the second element to be 0.7 (0.4+0.6/2). If the uncertainty threshold is 0.5, the MCQ system disregards the outlier detection for the second element because its uncertainty is greater than the uncertainty threshold (0.7>0.5).

After filtering, the MCQ system applies a RANSAC algorithm to the feature values $x_i(1)$, $x_i(2)$, $x_i(4)$, $x_i(k)$, ..., $x_i(K-2)$, $x_i(K-1)$, $x_i(K)$ (excluding those disregarded) to a RANSAC algorithm. For example, the RANSAC algorithm is applied to the first edge element of the feature vectors for images 1, 2, and 3 (when K=3), which generates a linear fit of the feature values as a function of time $y=ax_i(t_i)+b$ for $t_i \leq t \leq t_K$, as its feature model. The RANSAC algorithm randomly selects two values of $x_i(\cdot)$ from the set of values and uses these values to compute line y. The RANSAC algorithm also sets a uncertainty threshold which determines inliers and outliers. Subsequently, the RANSAC algorithm repeats the process for a fixed number of times until a line is found that maximizes the number of inliers.

When processing a target image, if the value of an element of a feature vector is determined to be an outlier, the MCQ system reports the distance $z_i$ between the maximal uncertainty $$q_i(k) = \Delta x_i(k) + \frac{\delta x_i(k)}{2}$$

and the value $x_i(k)$, as given by the equation:

$$z_i = \Delta x_i(k) + \frac{\delta x_i(k)}{2} - x_i(k)$$

The MCQ system sets features that are inliers to zero in the outlier time series to indicate that the feature did not change within the threshold and uncertainties used to determine a change. The MCQ system generates an outlier vector with elements including reported distances $z_i$ and elements that are zero for features where no change occurred. After the outliers of all features of the target object have been found, the MCQ system calculates the inner product of the outlier vector and a feature weight vector. If the inner product exceeds the change threshold, the MCQ system reports a change in the target object. The MCQ system may identify the features that produced the change and the magnitude of the change by examining the outlier vector.

Object Specific Analysis

As described above, the MCQ system employs the same algorithms for each object to determine its shadow area and its object area. In some embodiments, the MCQ system may associate different algorithms with different types of objects. More generally, each object in a scene model may have a set of algorithms associated with it. For example, the algorithms associated with a geodesic dome may be different from the algorithms associated with a rectangular building. As another example, the MCQ system may associate vegetation-specific algorithms to vegetation in a scene model. As another example, a parking lot may have an algorithm associated with for counting parked cars as an indicator of level of activity. Parked cars may be distinguished from moving cars based on their locations in or not in parking spaces. As discussed above, the algorithms may factor in uncertainly due to object obscuration. The algorithms may also be parameterized. For example, an algorithm associated with walls that are glass may have a parameter indicating whether the glass has an interior shade (e.g., room-darkening shade). If the parameter indicates a shade, the algorithm does not detect a change if the window in the target image is consistent with the shade being open or the shade being closed.

Machine Learning

In some embodiments, the MCQ system may employ various machine learning approaches to train a machine learning model to detect changes in a scene. The machine learning model may be trained using training data that includes images of objects labeled with various types of changes to be detected. For example, to detect whether a bay door of a warehouse is open or closed, a neural network may be trained using images warehouses with bay doors with labels indicating whether the bay door is open or closed. An object model for a warehouse may be associated with an algorithm to input a portion of an image containing the bay door to the machine learning model which outputs an indication of whether the door is open or closed. As another example, a machine learning model may be trained to detect the presence of significant potholes in roadway using training data that includes images of roadways labeled. The machine learning models may also be trained using pairs of images labeled with the type of change reflected in the images. For example, the training data for detecting whether a bay door is open or closed may include pairs of images labeled with whether both doors are open or closed or whether the first image represents a door closed and the second image represent a door open and vice versa. The training data may be also generated based on output of the MCQ system. The MCQ system may be used to process collections of images of target objects to detect and quantify the changes. The training data may include pairs of images labeled to indicate whether the pair represents a change in a target object and possibly a change score. After training, a pair of images is input to the machine learning algorithm to determine whether the images represent a change and a change score.

The machine learning model may be a classifier or combination of classifiers including neural networks such as fully-connected, convolutional, recurrent, autoencoder, or restricted Boltzmann machine, a support vector machine, a Bayesian classifier, and so on. When the classifier is a deep neural network, the training results in a set of weights for the activation functions of the deep neural network. A support vector machine operates by finding a hyper-surface in the space of possible inputs. The hyper-surface attempts to split the positive examples (e.g., feature vectors for photographs) from the negative examples (e.g., feature vectors for graphics) by maximizing the distance between the nearest of the positive and negative examples to the hyper-surface. This step allows for correct classification of data that is similar to but not identical to the training data. Various techniques can be used to train a support vector machine.

Adaptive boosting is an iterative process that runs multiple tests on a collection of training data. Adaptive boosting transforms a weak learning algorithm (an algorithm that performs at a level only slightly better than chance) into a strong learning algorithm (an algorithm that displays a low error rate). The weak learning algorithm is run on different subsets of the training data. The algorithm concentrates more and more on those examples in which its predecessors tended to show mistakes. The algorithm corrects the errors made by earlier weak learners. The algorithm is adaptive because it adjusts to the error rates of its predecessors. Adaptive boosting combines rough and moderately inaccurate rules of thumb to create a high-performance algorithm. Adaptive boosting combines the results of each separately run test into a single, very accurate classifier. Adaptive boosting may use weak classifiers that are single-split trees with only two leaf nodes.

A neural network model has three major components: architecture, cost function, and search algorithm. The architecture defines the functional form relating the inputs to the outputs (in terms of network topology, unit connectivity, and activation functions). The search in weight space for a set of weights that minimizes the objective function is the training process. In one embodiment, a radial basis function ("RBF") network and a standard gradient descent may be used as the search technique.

The computing systems on which the MCQ system may be implemented may include a central processing unit, input devices, output devices (e.g., display devices and speakers), storage devices (e.g., memory and disk drives), network interfaces, graphics processing units, cellular radio link interfaces, global positioning system devices, and so on. The input devices may include keyboards, pointing devices, touch screens, gesture recognition devices (e.g., for air gestures), head and eye tracking devices, microphones for voice recognition, and so on. The computing systems may include desktop computers, laptops, tablets, e-readers, personal digital assistants, smartphones, gaming devices, servers, and so on. The computing systems may access computer-readable media that include computer-readable storage media (or mediums) and data transmission media. The computer-readable storage media are tangible storage means that do not include a transitory, propagating signal. Examples of computer-readable storage media include memory such as primary memory, cache memory, and secondary memory (e.g., DVD) and other storage. The computer-readable storage media may have recorded on it or may be encoded with computer-executable instructions or logic that implements the MCQ system. The data transmission media is used for transmitting data via transitory, propagating signals or carrier waves (e.g., electromagnetism) via a wired or wireless connection. The computing systems may include a secure cryptoprocessor as part of a central processing unit for generating and securely storing keys and for encrypting and decrypting data using the keys. The computing systems may be servers that are housed in a data center such as a cloud-based data center.

The MCQ system may be described in the general context of computer-executable instructions, such as program modules and components, executed by one or more computers, processors, or other devices. Generally, program modules or components include routines, programs, objects, data structures, and so on that perform particular tasks or implement particular data types. Typically, the functionality of the program modules may be combined or distributed as desired in various embodiments. Aspects of the MCQ system may be implemented in hardware using, for example, an application-specific integrated circuit (ASIC) or field programmable gate array ("FPGA").

Figure 4:
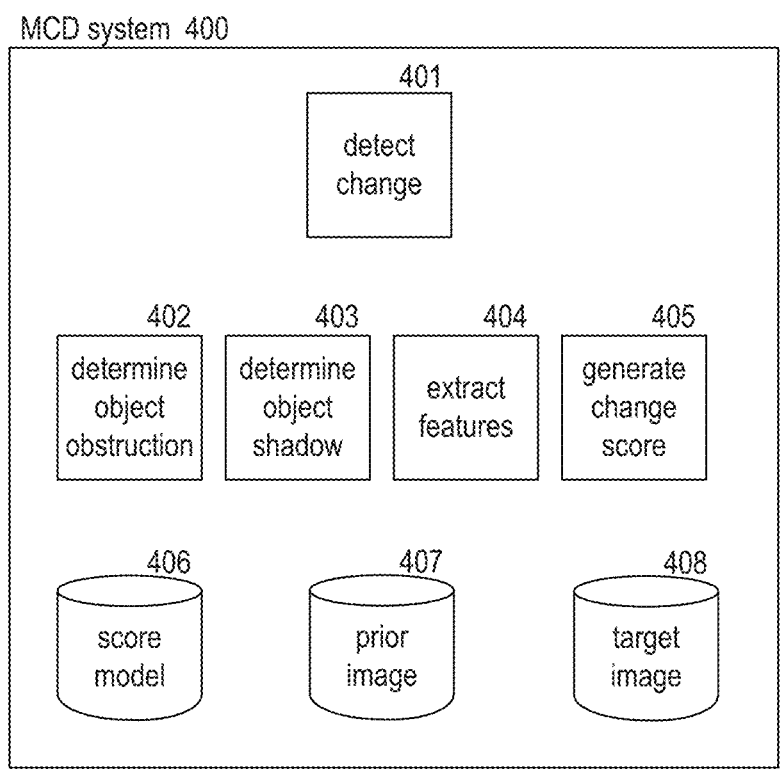
FIG. 4 is a block diagram that illustrates components of the MCQ system in some embodiments.

FIG. 4 is a block diagram that illustrates components of the MCQ system in some embodiments. The MCQ system 400 includes a detect change component 401, a determine object obstruction component 402, a determine object shadow component 403, an extract features component 404, and a generate change score component 405. The MCQ system also includes a scene model data store 406, a prior image data store 407, and a target image data store 408. The detect change component invokes the other components to determine whether the target image represents a change from the prior image based on the scene model. The determine object obstruction component identifies the portion of the target object that is obstructed given the scene model and the capture conditions. The determine object shadow component identifies the portion of the object that is in the shadow of another object given the scene model and the capture conditions. The extract features component extracts features of the target object from the target image given the scene model and object obstruction and object shadow. The generate change score component generates a change score based on the extracted features and uncertainties based on the object obstruction and object shadow. The scene model data store includes a definition of the scene using object models that include surfaces, edges, textures, and colors. The prior image data store includes features extracted from the prior image, and the target image data store contains the target image.

Figure 5:
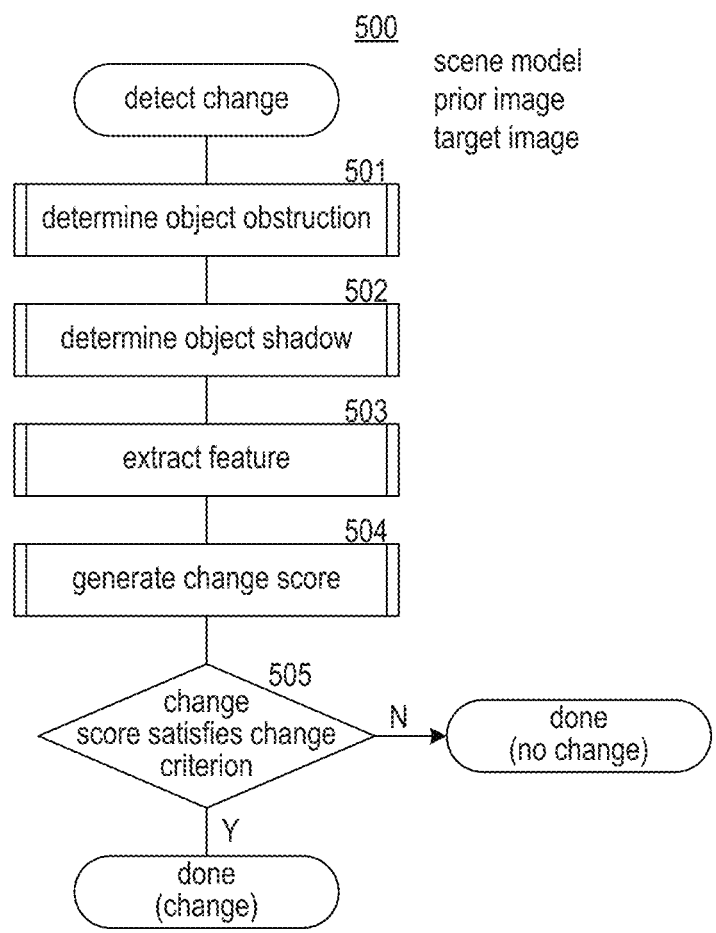
FIG. 5 is a flow diagram that illustrates the processing of the detect change component of the MCQ system in some embodiments.

FIG. 5 is a flow diagram that illustrates the processing of the detect change component of the MCQ system in some embodiments. The detect and quantify change component 500 is invoked to determine whether a change has occurred in a target object of a target image given a prior image in a scene model. In block 501, the component invokes the determine object obstruction component to identify the portion of the target object in the target image that is obstructed by other objects. In block 502, the component invokes the determine object shadow component to identify the portion of the target object in the target image that is in the shadow of other objects. In block 503, the component invokes an extract features component to extract features of the target object in the target image given the object obstructions and object shadows. In block 504, the component invokes the generate change score component to generate a change score based on the extracted features and uncertainties based on the obstructions and shadows and measurements. In decision block 505, if the change score satisfies a change criterion, the component completes indicating a change in the target object has been detected, else the component completes indicating that no change has been detected.

Figure 6:
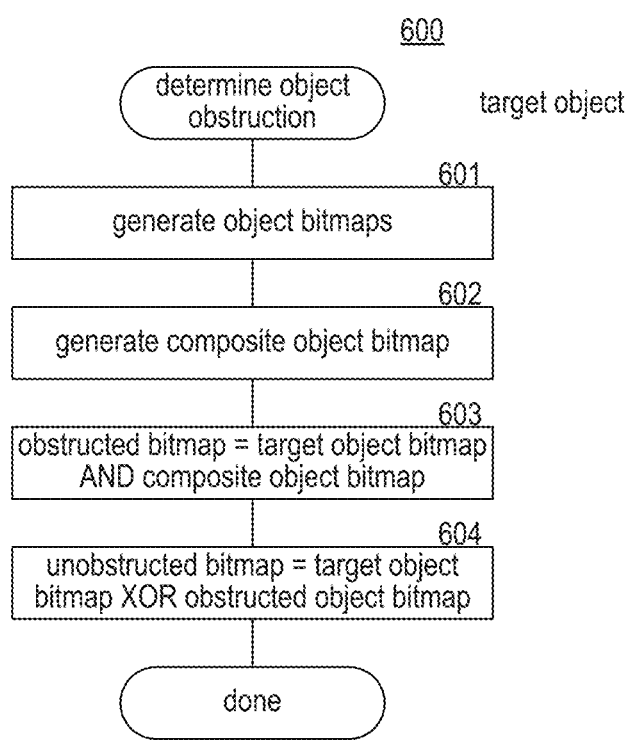
FIG. 6 is a flow diagram that illustrates the processing of the determine object obstruction component of the MCQ system in some embodiments.

FIG. 6 is a flow diagram that illustrates the processing of the determine object obstruction component of the MCQ system in some embodiments. The determine object obstruction component 600 is invoked to determine the portion of the target object that is obstructed by other objects. In block 601, the component generates object bitmaps for the model objects from the model scene given the capture conditions. In block 602, the component generates a composite object bitmap by logically ANDing the object bitmaps other than that for the target object. In block 603, the component generates an obstructed bitmap by logically ANDing the target object bitmap and the composite object bitmap. In block 604, the component generates an unobstructed bitmap by logically XORing the target object bitmap in the obstructed object bitmap. The component then completes.

Figure 7:
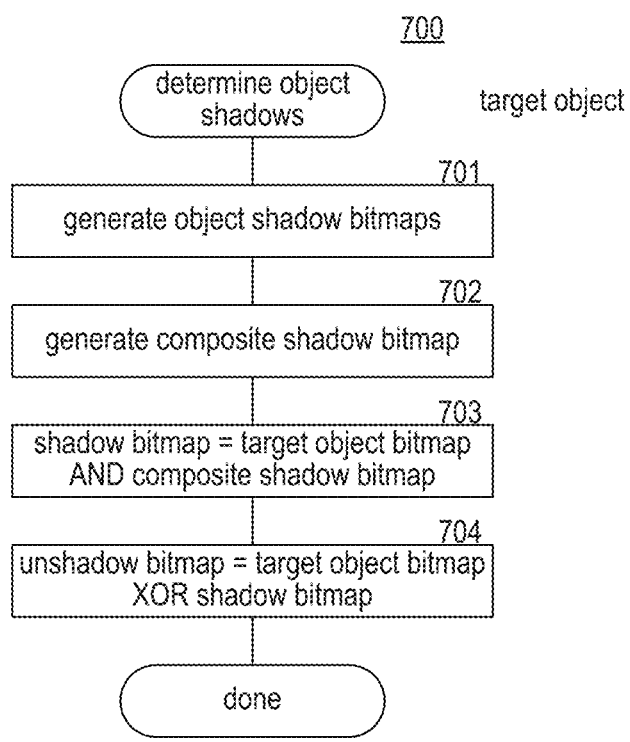
FIG. 7 is a flow diagram that illustrates the processing of a determine object shadows component of the MCQ system in some embodiments.

FIG. 7 is a flow diagram that illustrates the processing of a determine object shadows component of the MCQ system in some embodiments. The determine object shadows component 700 identifies the portion of the target object that is in the shadow of objects. In block 701, the component generates object shadow bitmaps for the model objects given the scene model and the capture conditions. In block 702, the component generates a composite shadow bitmap by logically ANDing the object shadow bitmaps. In block 703, the component generates a shadow bitmap by logically ANDing the target object bitmap and the composite shadow bitmap. In block 704, the component generates an un-shadow bitmap by logically XORing the target object bitmap and the shadow bitmap. The component then completes.

Figure 8:
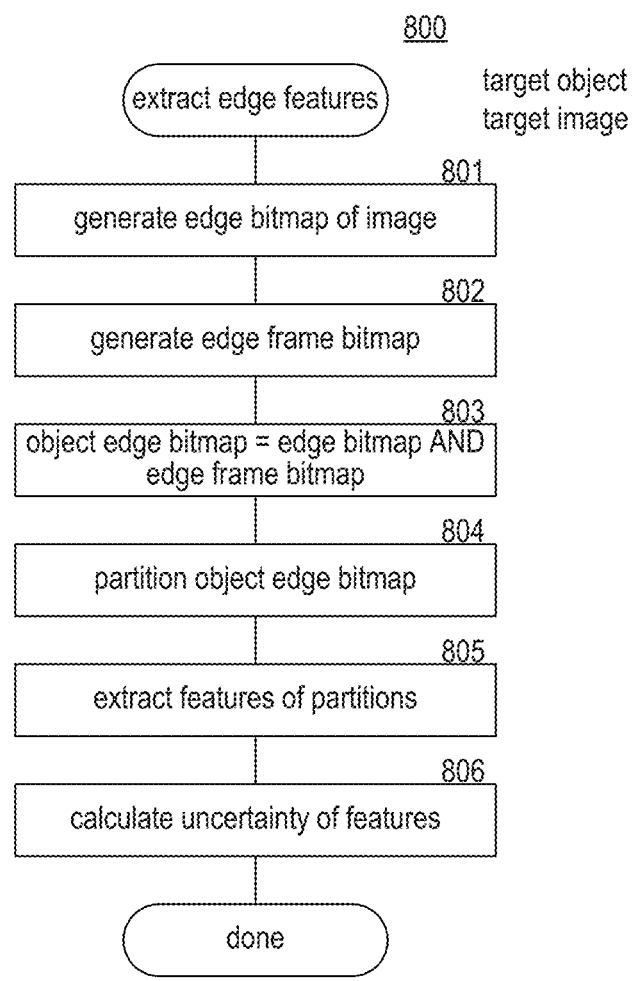
FIG. 8 is a flow diagram that illustrates a processing of an extract edge features component of the MCQ system in some embodiments.

FIG. 8 is a flow diagram that illustrates a processing of an extract edge features component of the MCQ system in some embodiments. The extract edge features component 800 is invoked to extract edge features of the target object from the target image. In block 801, the component generates an edge bitmap of the target image. In block 802, the component generates an edge frame bitmap by dilating an edge map of the target image. In block 803, the component generates an object edge bitmap by logically ANDing the edge bitmap and the edge frame bitmap. In block 804, the component partitions the object edge bitmap. In block 805, the component extracts the features representing each partition. In block 806, the component calculates for each partition the uncertainty for each feature. The component then completes.

Figure 9:
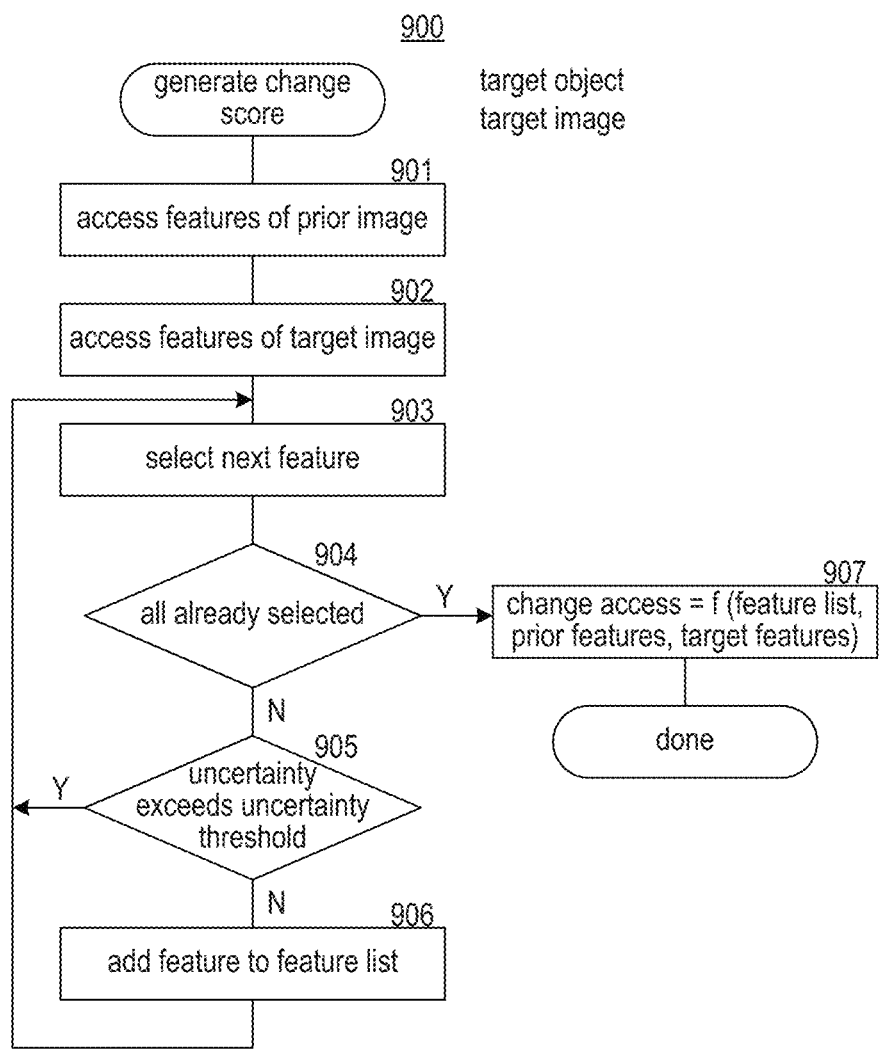
FIG. 9 is a flow diagram that illustrates the processing of the generate change score component of the MCQ system in some embodiments.

FIG. 9 is a flow diagram that illustrates the processing of the generate change score component of the MCQ system in some embodiments. The generate change score component 900 is invoked to generate a change score for the target object. In block 901, the component accesses features representing the prior image. In block 902, the component accesses features of the target image. In block 903, the component selects the next feature. In decision block 904, if all the features have already been selected, that the component continues at block 907, else the component continues at block 905. In decision block 905, if the uncertainty for the selected feature exceeds an uncertainty threshold, then the component disregards that feature and looks to block 903 to select the next feature, else the component continues at block 906. In block 906, the component adds the selected feature to a feature list and then looks to block 903 to select the next feature. In block 907, the component calculates a change score that is a function of the feature list, prior features, and target features. The feature score may be based on a weighted combination of the features of the feature list. The component then completes.

The following paragraphs describe various embodiments of aspects of the MCQ system. An implementation of the MCQ system may employ any combination of the embodiments. The processing described below may be performed by a computing device with a processor that executes computer-executable instructions stored on a computer-readable storage medium that implements the MCQ system.

In some embodiments, a method performed by one or more computing systems is provided for identifying a change in a scene having objects based on comparison of features representing a target object derived from a first image and a second image that includes the target object. The method accesses a scene model of the scene. The scene model being a 3D representation of objects of the scene. The method accesses first features and a first effectiveness of the first features. The first features are derived from a first image that includes the target object, and the first effectiveness indicates effectiveness of the first features in representing the target object. The method segments, based on a scene model of the scene, a second image that includes the target object to identify a second area representing the target object within the second image. The method extracts, from the second image, second features for the target object based on the second area. The method determines a second effectiveness of the second features indicating effectiveness of the second features in representing the target object. The method generates a change indicator based on a difference between the first features and the second features factoring in the first effectiveness and the second effectiveness. When the change indicator satisfies a change criterion, the method indicates a change in the target object. In some embodiments, the effectiveness of features of an image is determined factoring in a shadow cast on the target object and an obstruction area of the target object, an illumination source of the scene when that image was captured, a camera model of a camera that captured that image, the shadow being cast by an object in the scene and the obstruction resulting from an object in the scene. In some embodiments, the method further, for objects of the scene, determines an object shadow area indicating an object shadow area of a shadow cast by that object based on the illumination source and the camera model associated with the second image. The method further determines an in-shadow area of the target object based on the object shadow areas. The in-shadow area indicates area of the target object within the second image that is in a shadow cast by an object. The second effectiveness is based on the second area and the in-shadow area. In some embodiments, the method further, for objects of the scene, determines an object area indicating area of the second image corresponding that object based on the camera model associated with the second image. The method further determines an obstruction area of the target object based on the object areas. The second effectiveness is based on the target area and the obstruction area. In some embodiments, the segmenting of the second image includes generating a projection of the 3D representation of the scene onto the second image given the scene model factoring in a second camera model of a second camera that captured the second image and identifying edges of the target object within the second image based on the projection. In some embodiments, the method further identifies color and texture associated with the target object within the second image based on the projection. In some embodiments, the effectiveness of features factors in epistemic and aleatory uncertainties associated with the features. In some embodiments, the change indicator is based on a designated feature of first images of a collection of first images. In some embodiments, the method further generates a mathematical representation of the designated feature of the first images and wherein the generating of the change indicator employs the mathematical representation to determine whether the designated feature of the second image satisfies a threshold change from at first feature of the first images. In some embodiments, the scene is on the surface of the earth and the images are aerial images of the scene. In some embodiments, the first image is generated from the scene model. In some embodiments, the change indicator quantifies the amount of change. In some embodiments, the change criterion is based on amount of change indicated by the change indicator. In some embodiments, each object wherein each object in the scene has an object type and each object is associated with an algorithm adapted to extract features based on the object type of that object. In some embodiments, each object in the scene has an object type and each object is associated with an algorithm adapted to generate a change indicator based on the object type of that object. In some embodiments, each object in the scene has an object type and each object is associated with an algorithm adapted to quantify an amount of change in the object based on the object type of that object. In some embodiments, the method further generates training data for a machine learning algorithm. The training data includes features of target objects and indications of whether the features represent changes in the target objects.

In some embodiments, one or more computing systems are provided for identifying a change in a scene having objects based on comparison of features representing a target object derived from a first image and a second image that includes the target object. The one or more computing system include one or more computer-readable storage mediums for storing computer-executable instructions and one or more processors for executing the computer-executable instructions stored in the one or more computer-readable storage mediums. The instructions segment, based on a scene model of the scene, a second image that includes the target object to identify a second area representing the target object within the second image. The instructions extract, from the second image, second features for the target object based on the second area. The instructions determine a second effectiveness of the second features indicating effectiveness of the second features in representing the target object. The instructions detect a change based on a difference between first features and the second features factoring in a first effectiveness and the second effectiveness. The first features represent features of the target object in a first image, and the first effectiveness indicates effectiveness of the first features in representing the target object. In some embodiments, the effectiveness of a feature of an image is determined factoring in a shadow cast on the target object and an obstruction area of the target object. The shadow is cast by an object in the scene and the obstruction results from an object in the scene. In some embodiments, the instructions further, for objects of the scene, determine an object shadow area indicating an object shadow area of a shadow cast by that object based on capture conditions of the second image. The instructions then determine an in-shadow area of the target object based on the object shadow areas, the in-shadow area indicating area of the target object within the second image that is in a shadow cast by an object. The second effectiveness may be based on the second area and the in-shadow area. In some embodiments, the instructions further, for objects of the scene, determine an object area indicating area of the second image corresponding that object based on the camera model associated with the second image. The instructions then determine an obstruction area of the target object based on the object areas. The second effectiveness may be based on the target area and the obstruction area. In some embodiments, the instructions that segment the second image further generate a projection of the 3D representation of the scene onto the second image given the scene model factoring in a second camera model of a second camera that captured the second image and identify edges of the target object within the second image based on the projection. In some embodiments, the effectiveness of features factors in epistemic and aleatory uncertainties associated with the features. In some embodiments, the instructions generate mathematical representations of first features of a collection of first images and the instructions that detect a change apply the mathematical representations to the second features to determine whether a second feature is an outlier. In some embodiments, the instructions that detect a change apply a machine learning model training using training data with features labeled to indicate whether a change is reflected in the features. In some embodiments, an object model for an object is associated with an algorithm for detecting a change that is specific to that object. In some embodiments, each object in the scene has an object type and each object is associated with an algorithm adapted to extract features based on the object type of that object. In some embodiments, each object in the scene has an object type and each object is associated with an algorithm adapted to quantify changes based on the object type of that object. In some embodiments, the instructions that detect a change further generate a change score indicating amount of the change in the target object.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

The invention claimed is:

1. A method performed by one or more computing systems for identifying a change in a scene having objects based on comparison of features representing a target object derived from a first image and a second image that includes the target object, the method comprising:
  accessing a scene model of the scene, the scene model being a 3D representation of objects of the scene;
  accessing first features and a first effectiveness of the first features, the first features derived from a first image that includes the target object, the first effectiveness indicating effectiveness of the first features in representing the target object;
  segmenting, based on a scene model of the scene, a second image that includes the target object to identify a second area representing the target object within the second image;
  extracting, from the second image, second features for the target object based on the second area;
  determining a second effectiveness of the second features indicating effectiveness of the second features in representing the target object;
  generating a change indicator based on a difference between the first features and the second features factoring in the first effectiveness and the second effectiveness; and
  when the change indicator satisfies a change criterion, indicating a change in the target object.

2. The method of claim 1 wherein the effectiveness of features of an image is determined by factoring in a shadow cast on the target object and an obstruction area of the target object, an illumination source of the scene when that image was captured, a camera model of a camera that captured that image, the shadow being cast by an object in the scene and the obstruction resulting from an object in the scene.

3. The method of claim 2 further comprising:
  for each of one or more objects of the scene, determining an object shadow area indicating an area of a shadow cast by that object based on the illumination source and the camera model associated with the second image; and
  determining an in-shadow area of the target object based on the object shadow areas, the in-shadow area indicating area of the target object within the second image that is in a shadow cast by an object;
  wherein the second effectiveness is based on the second area and the in-shadow area.

4. The method of claim 2 further comprising:
  for each of one or more objects of the scene, determining an object area indicating an area of the second image corresponding that object based on the camera model associated with the second image; and
  determining an obstruction area of the target object based on the object areas;

wherein the second effectiveness is based on the target area and the obstruction area.

5. The method of claim 1 wherein the segmenting of the second image includes generating a projection of the 3D representation of the scene onto the second image given the scene model factoring in a second camera model of a second camera that captured the second image and identifying edges of the target object within the second image based on the projection.

6. The method of claim 5 further comprising identifying color and texture associated with the target object within the second image based on the projection.

7. The method of claim 1 wherein the effectiveness of features factors in epistemic and aleatory uncertainties associated with the features.

8. The method of claim 1 wherein the change indicator is based on a designated feature of first images of a collection of first images.

9. The method of claim 8 further comprising generating a mathematical representation of the designated feature of the first images and wherein the generating of the change indicator employs the mathematical representation to determine whether the designated feature of the second image satisfies a threshold change from at first feature of the first images.

10. The method of claim 1 wherein the scene is on the surface of the earth and the images are aerial images of the scene.

11. The method of claim 1 wherein the first image is generated from the scene model.

12. The method of claim 1 wherein the change indicator quantifies the amount of change.

13. The method of claim 12 wherein the change criterion is based on amount of change indicated by the change indicator.

14. The method of claim 1 wherein each object in the scene has an object type and each object is associated with an algorithm adapted to extract features based on the object type of that object.

15. The method of claim 1 wherein each object in the scene has an object type and each object is associated with an algorithm adapted to generate a change indicator based on the object type of that object.

16. The method of claim 1 wherein each object in the scene has an object type and each object is associated with an algorithm adapted to quantify an amount of change in the object based on the object type of that object.

17. The method of claim 1 further comprising generating training data for a machine learning algorithm, the training data including features of target objects and indications of whether the features represent changes in the target objects.

18. One or more computing systems for identifying a change in a scene having objects based on comparison of features representing a target object derived from a first image and a second image that includes the target object, the one or more computing system comprising:
   one or more computer-readable storage mediums for storing computer-executable instructions for controlling the one or more computing systems to:
      segment, based on a scene model of the scene, a second image that includes the target object to identify a second area representing the target object within the second image;
      extract, from the second image, second features for the target object based on the second area;
      determine a second effectiveness of the second features indicating effectiveness of the second features in representing the target object; and
      detect a change based on a difference between first features and the second features factoring in a first effectiveness and the second effectiveness, the first features representing features of the target object in a first image, the first effectiveness indicating effectiveness of the first features in representing the target object; and
   one or more processors for executing the computer-executable instructions stored in the one or more computer-readable storage mediums.

19. The one or more computing systems of claim 18 wherein the effectiveness of a feature of an image is determined by factoring in a shadow cast on the target object and an obstruction area of the target object, the shadow being cast by an object in the scene and the obstruction resulting from an object in the scene.

20. The one or more computing systems of claim 19 wherein the computer executable instructions further control the one or more computing systems to:
   for each of one or more objects of the scene, determine an object shadow area indicating an area of a shadow cast by that object based on capture conditions of the second image; and
   determine an in-shadow area of the target object based on the object shadow areas, the in-shadow area indicating area of the target object within the second image that is in a shadow cast by an object;
   wherein the second effectiveness is based on the second area and the in-shadow area.

21. The one or more computing systems of claim 19 wherein the computer executable instructions further control the one or more computing systems to:
   for each of one or more objects of the scene, determine an object area indicating an area of the second image corresponding to that object based on a camera model associated with the second image; and
   determine an obstruction area of the target object based on the object areas;
   wherein the second effectiveness is based on the target area and the obstruction area.

22. The one or more computing systems of claim 18 wherein the instructions that segment the second image further generate a projection of a 3D representation of the scene onto the second image given the scene model by factoring in a second camera model of a second camera that captured the second image and identify edges of the target object within the second image based on the projection.

23. The one or more computing systems of claim 18 wherein the effectiveness of features factors in epistemic and aleatory uncertainties associated with the features.

24. The one or more computing systems of claim 18 wherein the instructions further control the one or more computing systems to generate mathematical representations of first features of a collection of first images and wherein the instructions that detect a change apply the mathematical representations to the second features to determine whether a second feature is an outlier.

25. The one or more computing systems of claim 18 wherein the instructions that detect a change apply a machine learning model training by using training data with features labeled to indicate whether a change is reflected in the features.

26. The one or more computing systems of claim 18 wherein an object model for an object is associated with an algorithm for detecting a change that is specific to that object.

27. The one or more computing systems of claim 18 wherein each object in the scene has an object type and each object is associated with an algorithm adapted to extract features based on the object type of that object.

28. The one or more computing systems of claim 18 wherein each object in the scene has an object type and each object is associated with an algorithm adapted to quantify changes based on the object type of that object.

29. The one or more computing systems of claim 18 wherein the instructions that detect a change further generate a change score indicating amount of the change in the target object.

30. The one or more computing system of claim 18 wherein instructions further include instructions that generate training data for a machine learning algorithm that includes features labeled with whether the features represent a change.

31. The one or more computing systems of claim 18 wherein the instructions that detect a change further generate a feature change score for a feature that indicates amount of the change in that feature of the target object.

\* \* \* \* \*